Sept. 5, 1961  A. H. DALL  2,998,867
VIBRATION DAMPER
Filed June 30, 1958

INVENTOR.
ALBERT H. DALL
BY Howard Keiser
+ John F. Verhoeven
ATTORNEYS

United States Patent Office 2,998,867
Patented Sept. 5, 1961

2,998,867
VIBRATION DAMPER
Albert H. Dall, Cincinnati, Ohio, assignor to The Cincinnati Milling Machine Co., Cincinnati, Ohio, a corporation of Ohio
Filed June 30, 1958, Ser. No. 745,724
1 Claim. (Cl. 188—1)

This invention relates to a vibration damper for machine tools, and more particularly, to a damper for absorbing and/or attenuating vibration in a machine tool element which acts in a substantially horizontal plane.

Machine tools, and especially tools of the milling machine type, are subject to severe vibrations resulting from the intermittent cutting action of the cutter teeth as they remove chips from the work. In milling machines of the fixed bed type, these vibrations are particularly pronounced in the region of the spindle carrier of the machine which primarily receives the impact forces impressed on the cutter as the individual teeth thereof successively engage with the work. In the case of those milling machines in which the cutter axis lies in a horizontal plane and the spindle carrier is mounted for vertical sliding movement on ways suitably provided therefor, it has been found that the most severe vibratory forces acting on the spindle carrier lie in a horizontal plane when the machine is used for face milling operations. Hence, it is desirable to provide in a machine of this type, a vibration damper which is effective to absorb energy from the horizontally directed oscillations of the spindle carrier so as to improve the surface finish produced by the cutter on the work and also to reduce the noise generated by the vibrations.

For this purpose, it has been found that a friction type damper is very effective provided the mass of the damper element is substantial as compared to the mass of the vibrating part, i.e., the spindle carrier, and also provided that means is incorporated in the device for adjusting the downward force of the damper element against the friction surface so that the damper element will move relative to the vibrating element of the machine tool under the influence of the horizontal vibrations occurring therein. In the vibration damper of the present invention, these features have been incorporated in a simple but effective device for attenuating the troublesome vibrations produced in a machine tool element, such as a spindle carrier, although it will be apparent from a considered study of the invention that it may equally well be applied to any other machine tool element in which the most severe vibrations occur in a horizontal plane.

Hence, it is an object of the present invention to provide a vibration damper for machine tools which is effective to reduce vibrations acting in a horizontal plane.

Another object of the invention is to provide a horizontal friction type vibration damper in which the mass of the damper element is substantial as compared to the mass of the vibrating element and in which means is provided for adjusting the downward force of the damper element against the friction surface so as to enable proper conditions to be achieved for effective damping of the vibrations occurring in the element.

With these and other objects in view, which will become apparent from the following description, the invention includes certain novel features of construction and combinations of parts, the essential elements of which are set forth in the appended claim, and a preferred form or embodiment of which will hereinafter be described with reference to the drawings which accompany and form a part of this specification.

In the drawings.

Similar reference characters designate similar or identical elements and portions throughout the specification and throughout the different views of the drawings.

Figure 1:
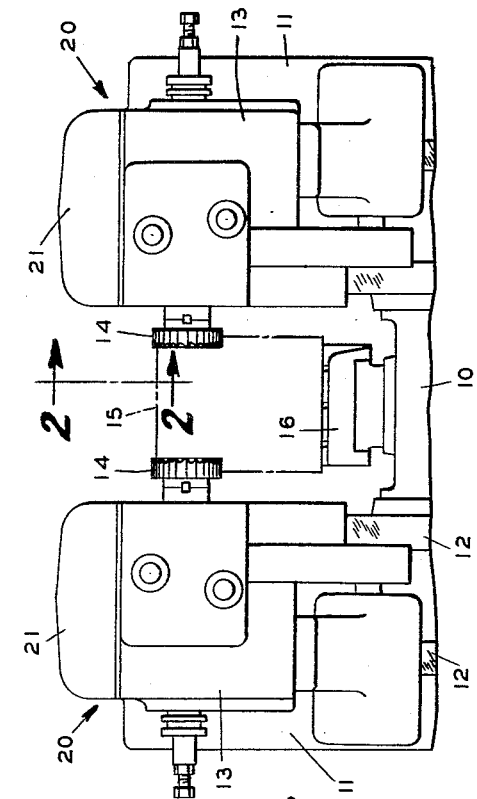
FIG. 1 is a side elevation of a duplex horizontal milling machine to which the invention is shown applied.

The machine tool to which the invention is shown applied in FIG. 1 includes a bed 10 which is provided with a pair of upwardly extending columns 11. Each column is provided with a pair of ways 12 on which a spindle carrier 13 is supported for vertical sliding movement. Each spindle carrier contains a drive mechanism for rotating a spindle on which may be mounted a milling cutter 14. In the embodiment shown in FIG. 1 the cutters are of the face mill type and are shown operating on a workpiece 15 supported on a table 16 which is mounted for longitudinal sliding movement on the bed 10.

Figure 3:
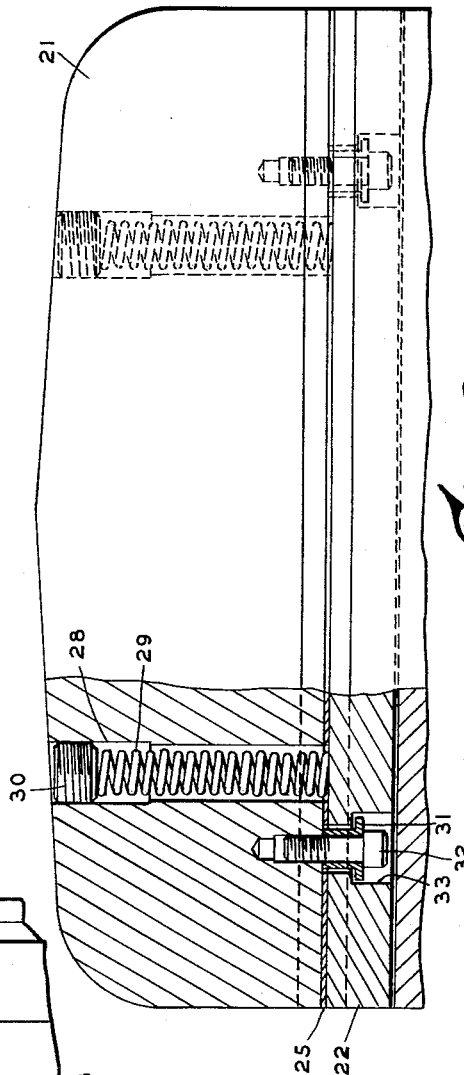
FIG. 3 is a side view of one of the vibration dampers with a part of the damper shown in cross section.
Figure 2:
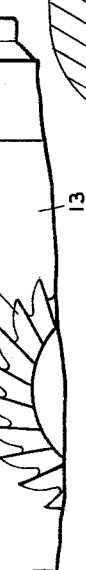
FIG. 2 is a fragmentary view taken along the line 2—2 in FIG. 1 which provides an end view of one of the vibration dampers shown in FIG. 1.

As hereinbefore explained, the action of the cutters 14 on the workpiece 15 causes the spindle carrier 13 to vibrate, the most severe vibrations acting in a horizontal plane due to the reaction of the cutting teeth on the work and the geometry of the machine structure. To reduce the vibrations thus produced in the spindle carriers 13, each spindle carrier is provided with a vibration damper 20, the detailed construction of which is best shown in FIGS. 2 and 3. As therein shown, each vibration damper inclues a damper element 21 consisting of a mass of iron or other heavy metal, the bottom surface of which is planed flat so as to mate with a similar flat surface provided on the top of a mounting plate 22. The latter plate is formed with a dovetail rib adapted to be received in a dovetail groove 23 (FIG. 2) which is formed in the top of the spindle carrier. A tapered gib 24 serves to lock the plate 22 in place on the spindle carrier, although any other suitable type of clamping means may be provided for this purpose.

A sheet of friction material 25 is interposed between the bottom surface of the damper element 21 and the top surface of the mounting plate 22. A preferred friction material is a cork gasket composition impregnated with Neoprene which is sold by the Armstrong Cork Company under the name of "Corprene." This material provides an impermeable and somewhat compressible sheet with good oil resistance and suitable frictional characteristics for the purpose intended. The sheet 25 is adhered or bonded to the mounting plate by a suitable adhesive so as to hold it from moving out of position between the elements 21 and 22. It is also possible, of course, to adhere the sheet 25 to the bottom of the damper element instead of to the top of the mounting plate with equally satisfactory results.

As previously mentioned, the mass of the damper element 21 is such as to be substantial as compared to the mass of the spindle carrier 13 so as to provide sufficient inertia to permit considerable weight to be applied by the element 21 to the friction material 25 without interfering with the relative movement between the elements 21 and 22. Hence, the sliding friction of the element 21 on the material 25 will cause the energy of the vibrations produced in the spindle carrier to be dissipated in the form of heat which is absorbed by the element 21 and radiated to the surrounding air.

To permit the amount of downward force exerted by the damper element 21 against the friction material 25 to be adjusted as necessary to permit the desirable sliding action between the elements to take place, means is provided for relieving a suitable portion of the weight of the element 21 from the surface of the sheet material 25. For this purpose, two vertically extending bores 28 are provided in the element with the upper end of each bore threaded to receive a screw plug 30.

Within each bore is received a helical compression spring 29, the lower end of which is received by an aperture provided in the sheet of friction material 25 so as to bear against the upper surface of the plate 22 while the upper end of the spring presses against the underside of the plug 30. Hence, by screwing the plugs 30 in or out of the bores 28, it is possible to adjust the compressive force exerted by the springs and thereby the portion of the weight of element 21 supported by the springs. Two such springs are provided in the case of each damper element 21 herein shown, it being found that this arrangement is the most suitable for the purpose intended.

In order to limit the movement of the element 21 with reference to the mounting plate 22, a lost motion connection has been provided as shown in FIG. 3. This connection includes a pair of headed sleeves 31 each secured by a bolt 32 to the underside of the damper element 21. Each sleeve 31 is received in a shouldered aperture 33 provided in the mounting plate 22. Clearance is provided between the sides of the sleeve 31 and the sides of the aperture 33 to permit sliding movement of the element 21 relative to the mounting plate to effect damping. Clearance is also provided between the head of the sleeve 31 and the shoulder of the aperture 33 to permit the free sliding movement above mentioned. The sheet material 25 is apertured in the vicinity of each of the apertures 33 so as to permit the upper ends of the sleeves 31 to bear against the bottom surface of the element 21.

When the spindle carrier is subjected to horizontal vibrations, the element 21, due to its mass, tends to lag the movement of the spindle carrier and acts directly in opposition to the instantaneous direction of the vibrations. By means of the screw plug 30, it is possible to adjust the compression of the springs 29 to the point where the desired sliding action of the element 21 on the friction material 25 will take place. Obviously, if the downward force of the element 21 against the friction material is too great, the element will move with the spindle carrier and the damping action of the element 21 cannot take place. It is necessary, therefore, to compress the springs 29 to the point where they support a sufficient portion of the weight of the element 21 to permit the sliding action to take place and effective vibration damping to be achieved.

While the invention has been described in connection with a specific embodiment thereof, it will readily be apparent that alterations and modifications could be made therein without departing from the spirit of the invention as defined by the claim which follows:

What is claimed is:

A vibration dampener for the spindle carrier of a horizontal milling machine comprising a mounting plate adapted to be secured to the top of the spindle carrier, said mounting plate being provided with a flat, horizontal upper surface, a damper element of substantial mass compared to that of the spindle carrier, said damper element being provided with a flat surface adapted to mate with the flat upper surface of the mounting plate, a sheet of friction material interposed between the flat surfaces of the damper element and the mounting plate and substantially co-extensive therewith, said sheet being secured to one of said surfaces and free to slide with respect to the other of said surfaces to thereby permit frictional sliding movement between one face of the friction material and its associated flat surface, spring means acting between said damper element and the spindle carrier for removing a portion of the weight of the damper element from said sheet of frictional material so as to permit the damper element to move independently of the spindle carrier and thereby damp out the horizontal vibrations occurring therein by virtue of the sliding friction between the friction material and its associated flat surface, and a lost-motion connection between said damper element and said spindle carrier for limiting the horizontal and vertical movement of the damper element relative to the mounting plate.

References Cited in the file of this patent

UNITED STATES PATENTS

| | | |
|---|---|---|
| 989,958 | Frahm | Apr. 18, 1911 |
| 1,726,045 | Sneed | Aug. 27, 1929 |
| 1,819,665 | Wiltse | Aug. 18, 1931 |
| 1,974,562 | Dodge | Sept. 25, 1934 |
| 2,119,027 | Rondelle | May 31, 1938 |
| 2,173,342 | Rosenzweig | Sept. 19, 1939 |
| 2,275,783 | Martellotti | Mar. 10, 1942 |